(12) United States Patent
Wolters et al.

(10) Patent No.: US 7,659,336 B2
(45) Date of Patent: Feb. 9, 2010

(54) NUCLEATING AGENT ADDITIVE COMPOSITIONS AND METHODS

(75) Inventors: Weihua Sonya Wolters, Boiling Springs, SC (US); Rob Hanssen, Ghent (BE); Thaneerpandal K. Palanisami, Ghent (BE); Darin L. Dotson, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 11/536,756

(22) Filed: Sep. 29, 2006

(65) Prior Publication Data

US 2007/0213439 A1   Sep. 13, 2007

Related U.S. Application Data

(60) Provisional application No. 60/780,296, filed on Mar. 8, 2006.

(51) Int. Cl.
*C08K 5/098* (2006.01)
*C08K 5/09* (2006.01)
*C08L 23/12* (2006.01)
*C08L 23/10* (2006.01)

(52) U.S. Cl. ............ 524/395; 524/396; 524/394; 524/321; 524/400; 524/284; 524/583

(58) Field of Classification Search ............ 524/321, 524/394, 396, 400, 583, 284, 395
See application file for complete search history.

(56) References Cited

U.S. PATENT DOCUMENTS

| | | | | |
|---|---|---|---|---|
| 4,463,113 A | 7/1984 | Nakahara et al. | ............ | 524/117 |
| 5,049,605 A | 9/1991 | Rekers | ............ | 524/108 |
| 5,342,868 A | 8/1994 | Kimura et al. | ............ | 524/108 |
| 6,465,551 B1 | 10/2002 | Zhao et al. | ............ | 524/284 |
| 6,521,685 B1 | 2/2003 | Zhao | ............ | 524/396 |
| 6,562,890 B2 | 5/2003 | Dotson | ............ | 524/396 |
| 6,586,007 B2 | 7/2003 | Lake, Jr. et al. | ............ | 424/486 |
| 6,642,290 B1 * | 11/2003 | Dotson | ............ | 524/108 |
| 6,911,517 B2 | 6/2005 | Dotson | | |
| 6,995,202 B2 | 2/2006 | Lake, Jr. et al. | ............ | 524/285 |
| 2005/0038151 A1 | 2/2005 | Kochanowicz et al. | | |
| 2005/0038155 A1 | 2/2005 | Berghmans et al. | | |

FOREIGN PATENT DOCUMENTS

JP          61-138652     *   6/1986

OTHER PUBLICATIONS

JP 61-138652 (abstract in English).*
Milliken pending application in US. Hanssen et al., U.S. Appl. No. 11/078,003, Milliken file No. 5820A, title: Thermoplastic and nucleating agent compositions and methods, filed Mar. 11, 2005.

* cited by examiner

*Primary Examiner*—David Wu
*Assistant Examiner*—Rip A. Lee
(74) *Attorney, Agent, or Firm*—Robert M. Lanning

(57) ABSTRACT

A blend of two different compounds may be applied together to form a nucleating agent additive composition. This additive composition is useful as an additive in thermoplastics, polyolefins and/or polymer resins. A blend of a bicyclo[2.2.1] heptane dicarboxylate salt and a dicarboxylate calcium metal salt provide useful and beneficial physical property effects in molded polymeric articles in terms of shrinkage and crystallization temperature of polymer resin compositions.

11 Claims, 10 Drawing Sheets

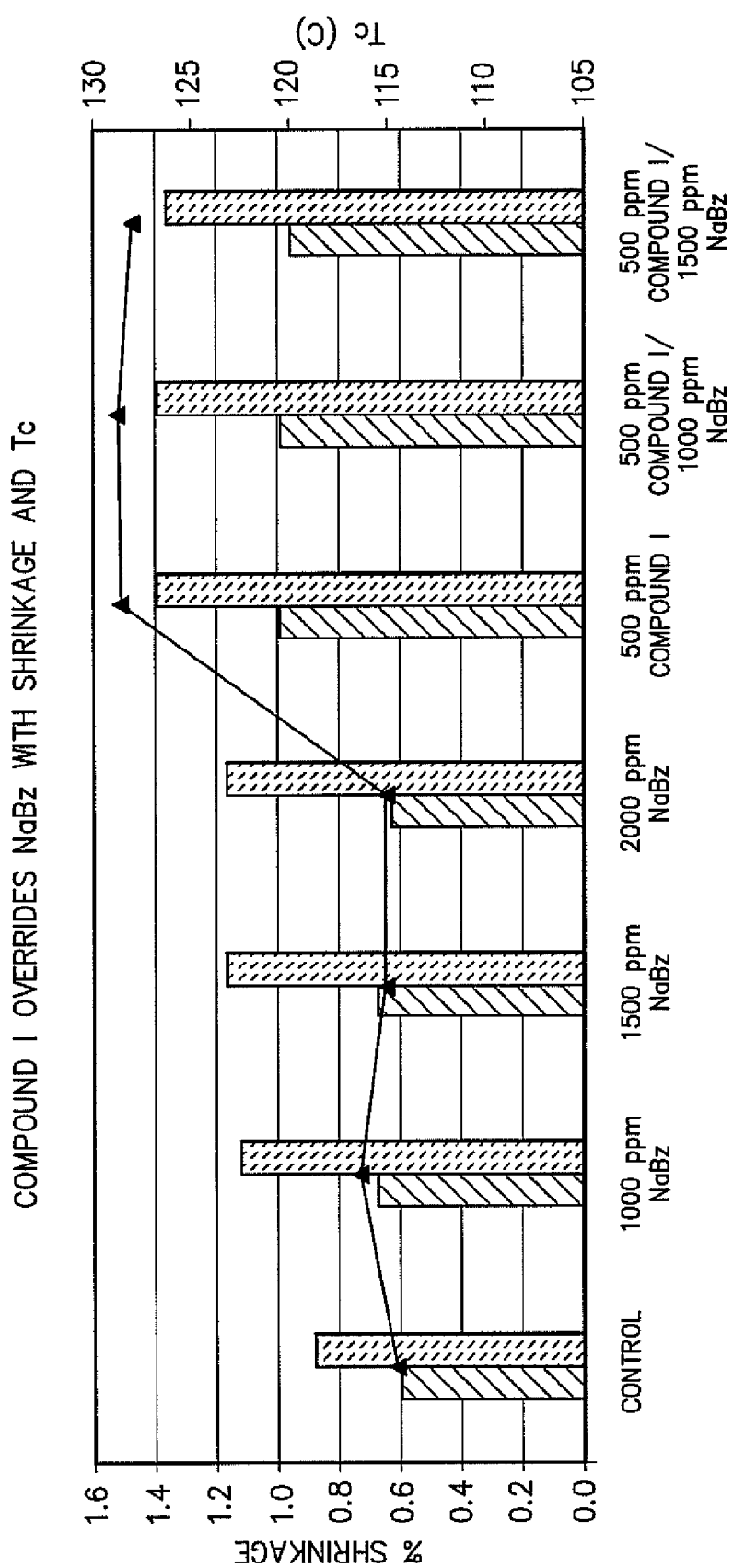
Figure -1-

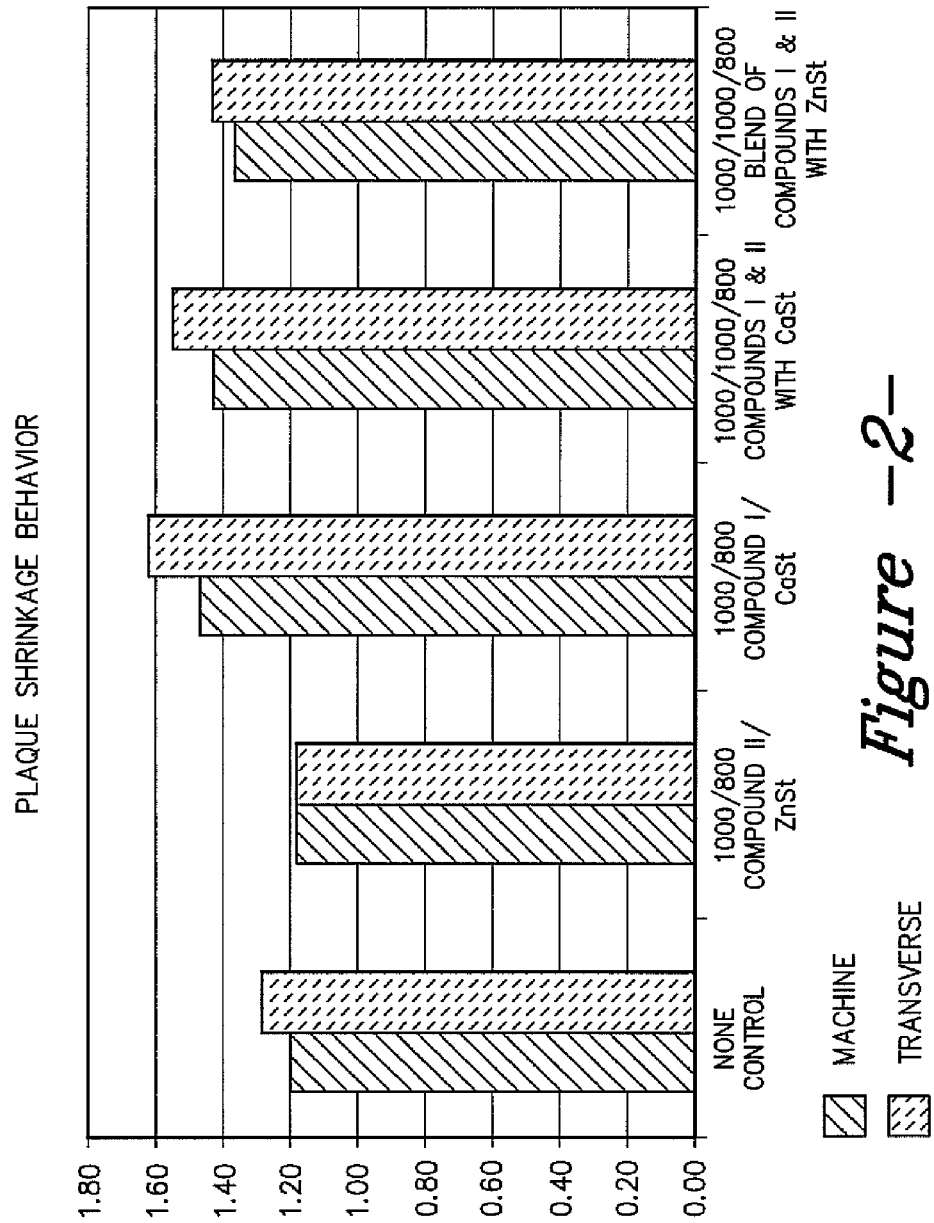
Figure -2-

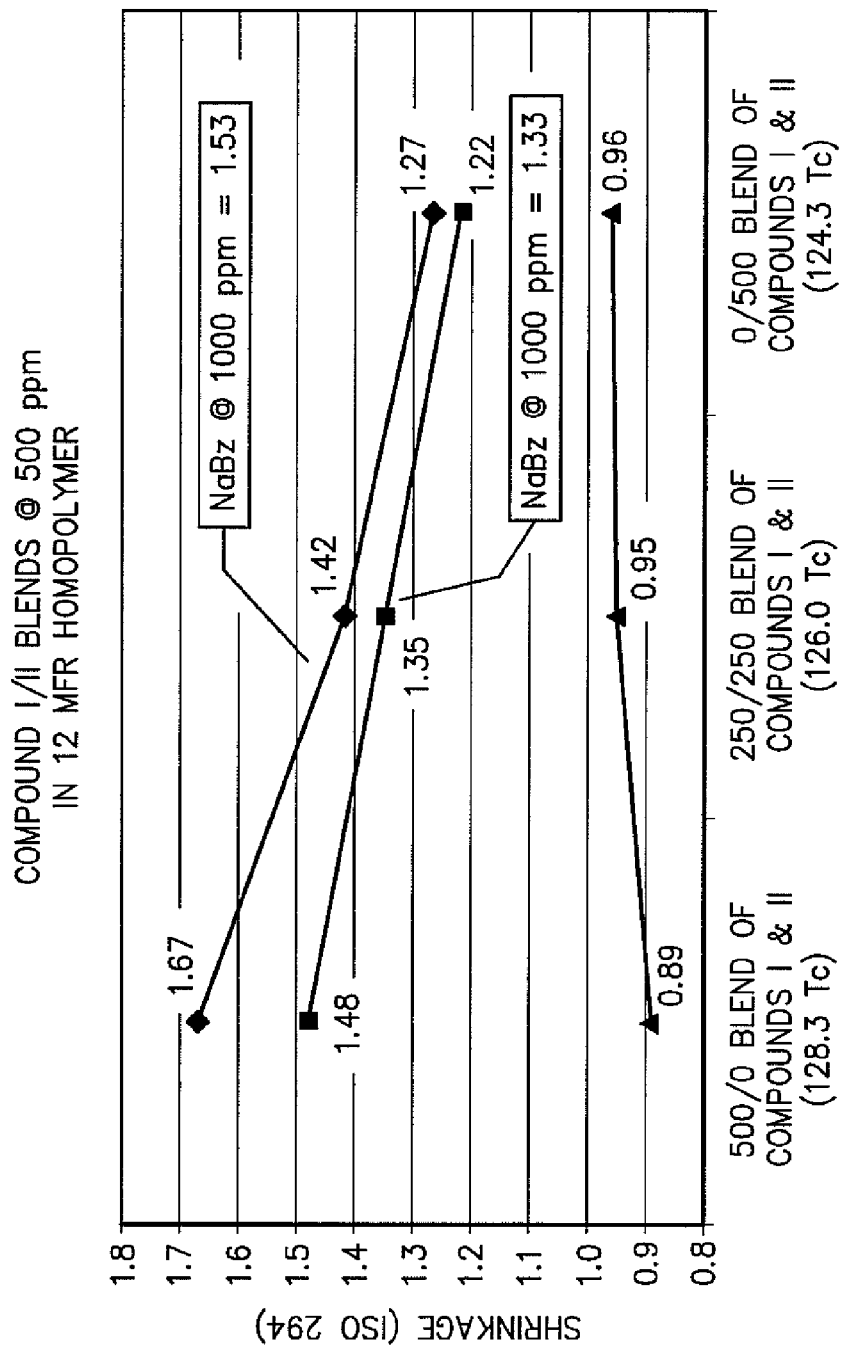
Figure -3-

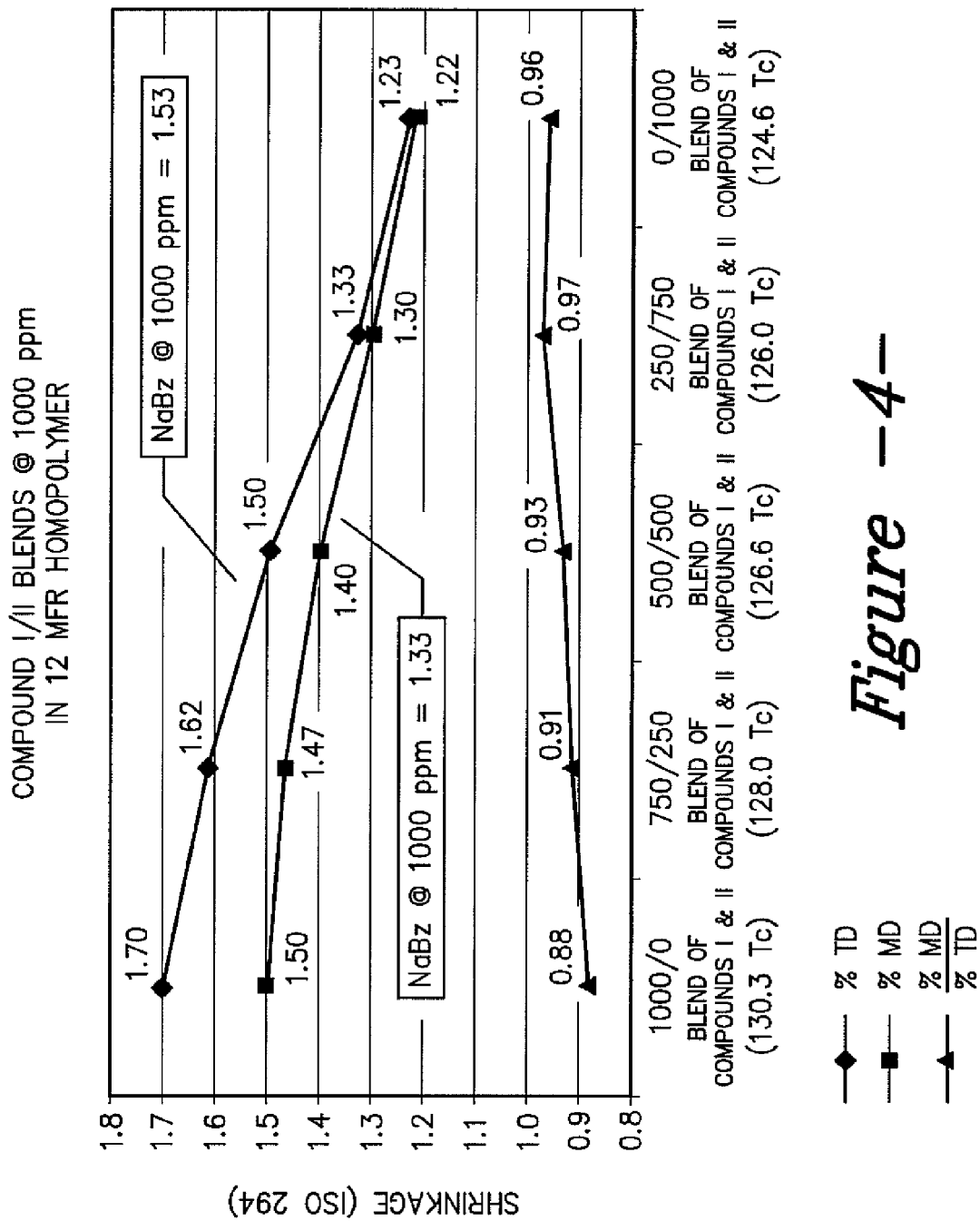
Figure -4-

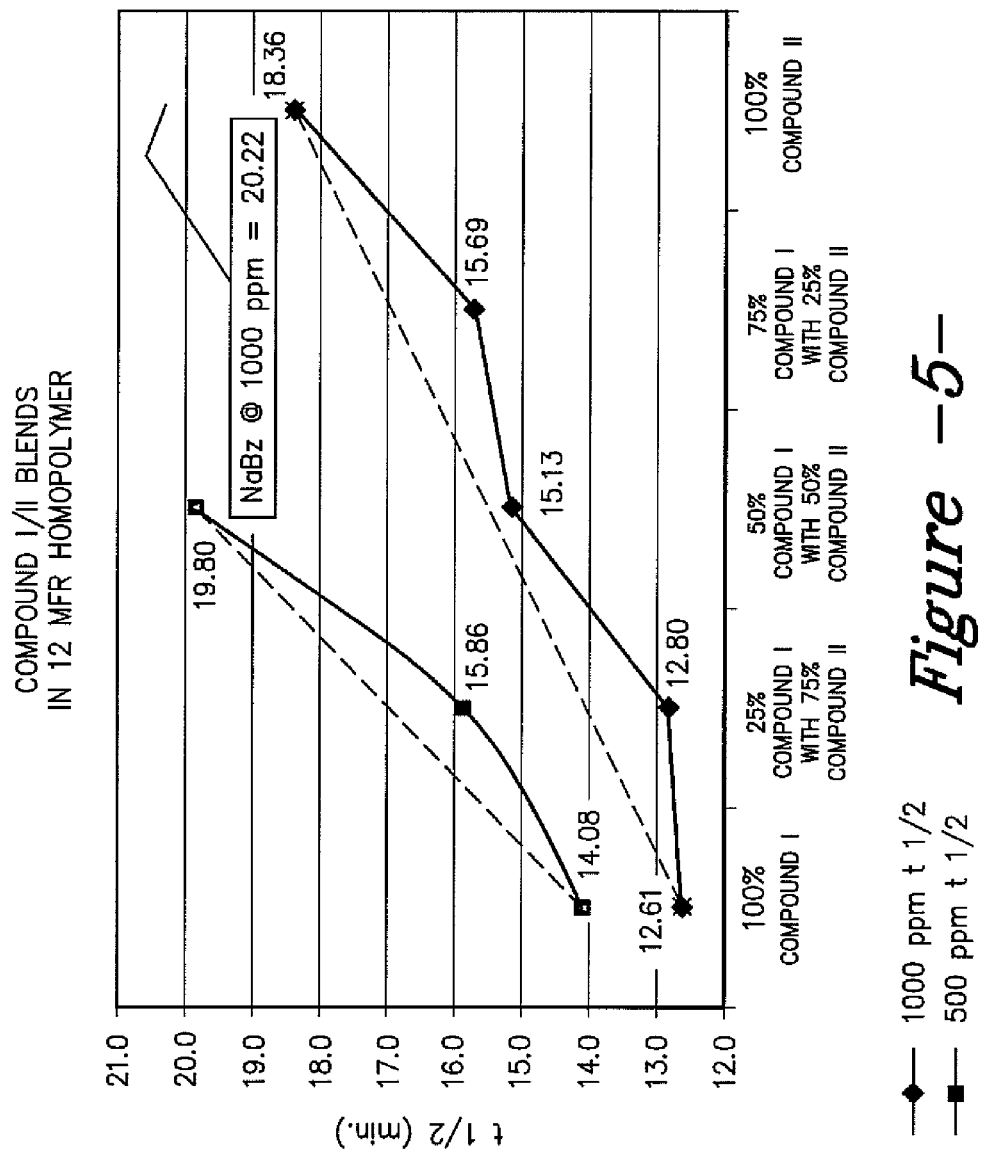
Figure -5-

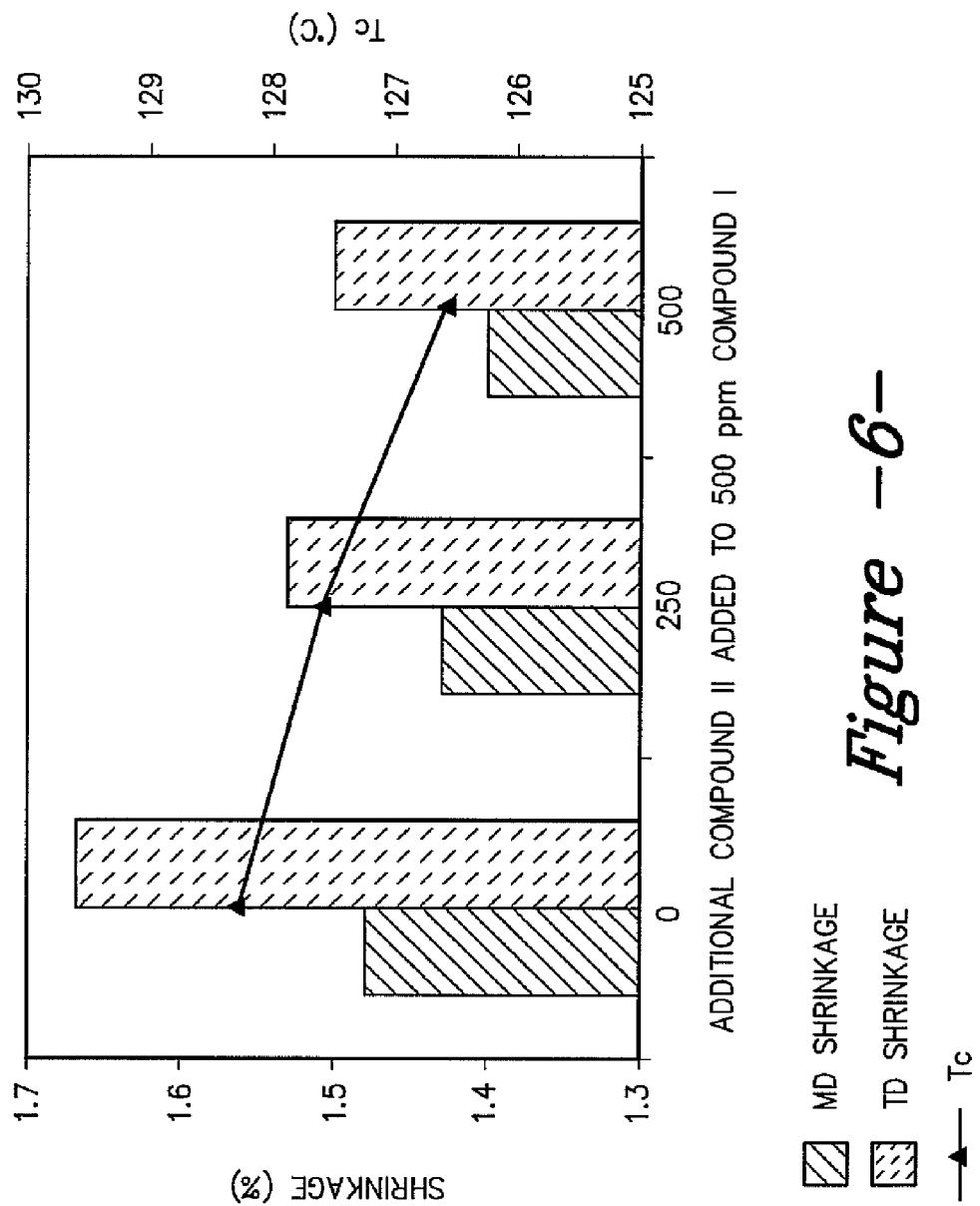
Figure -6-

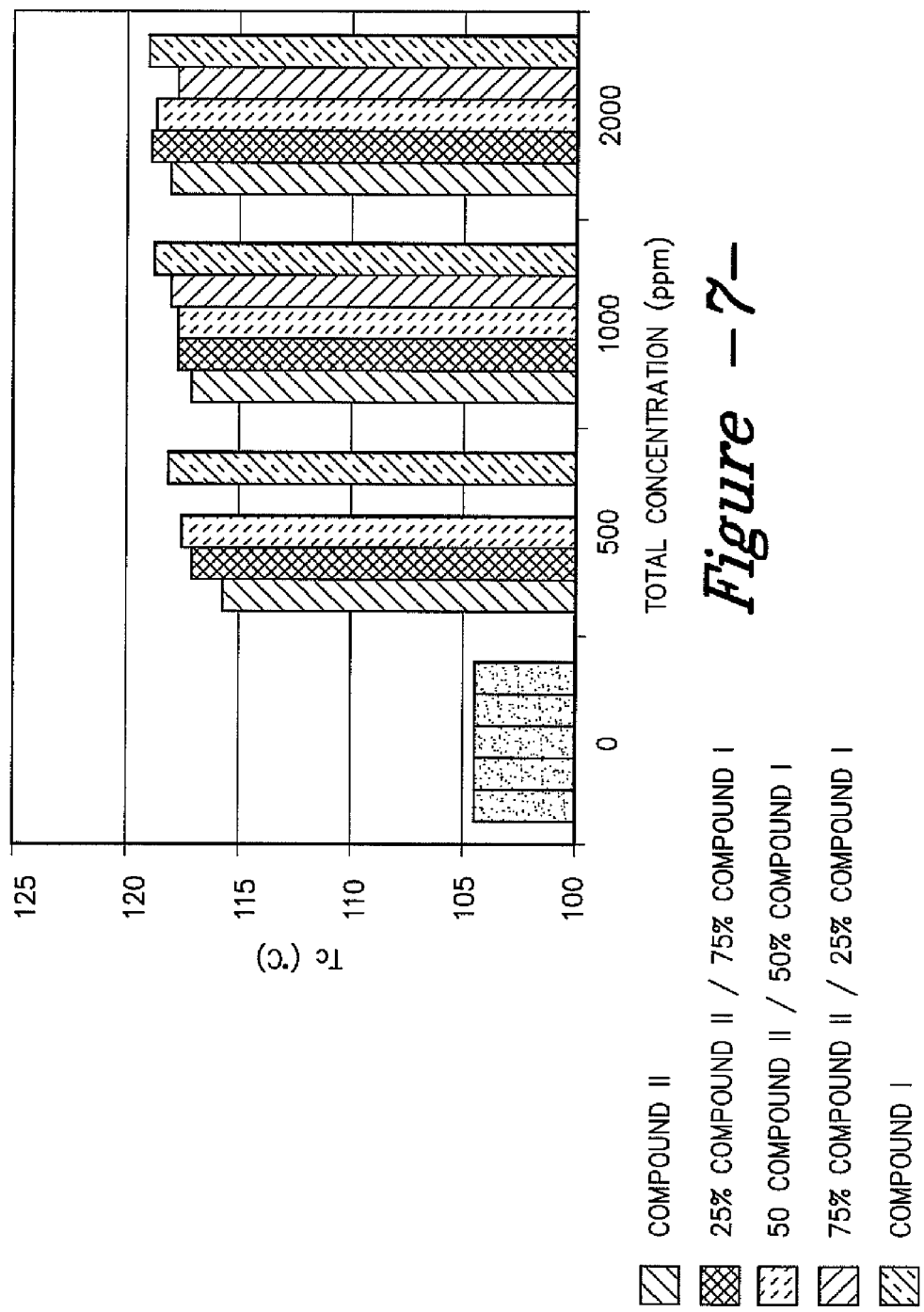
Figure -7-

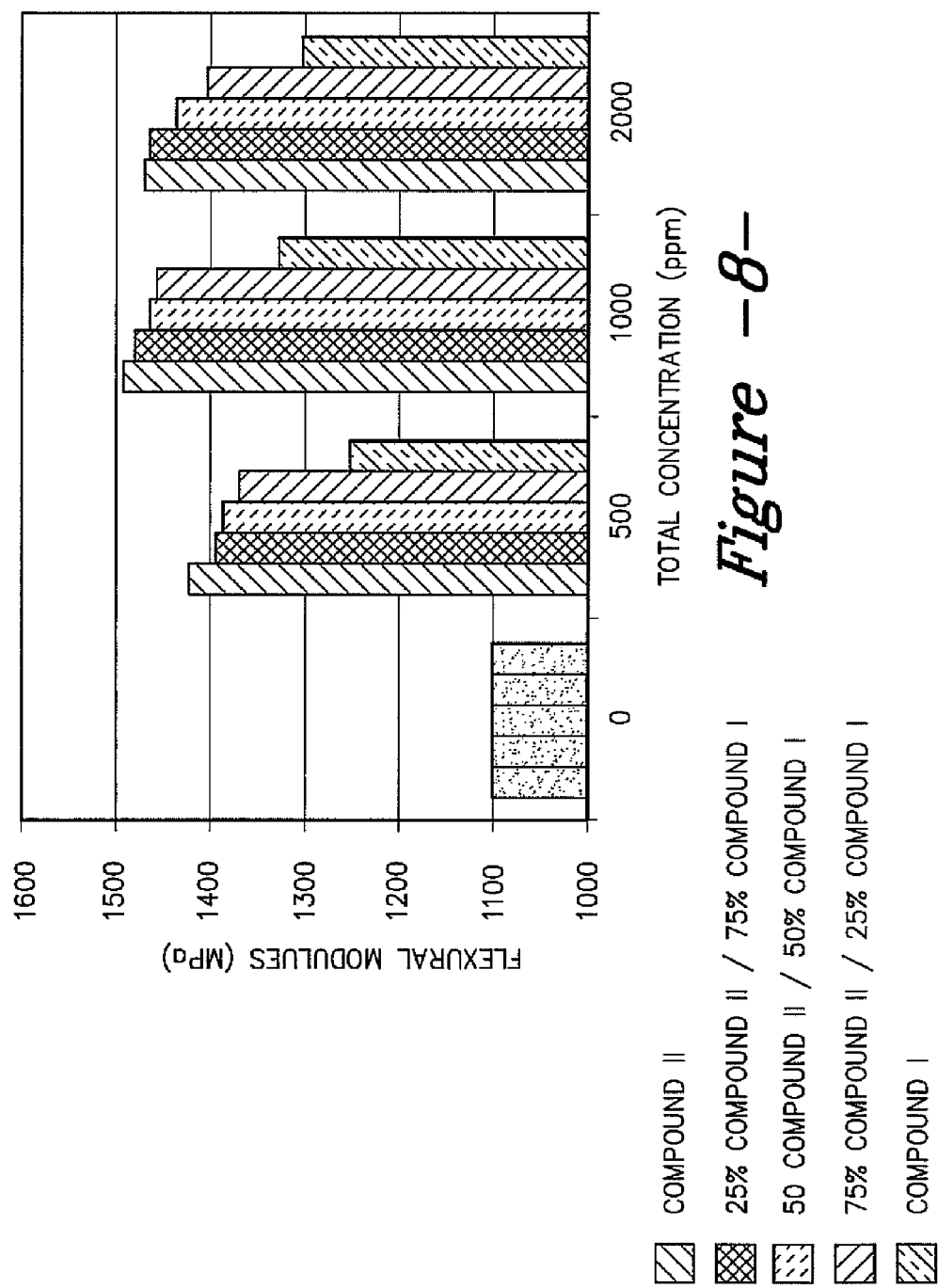
Figure -8-

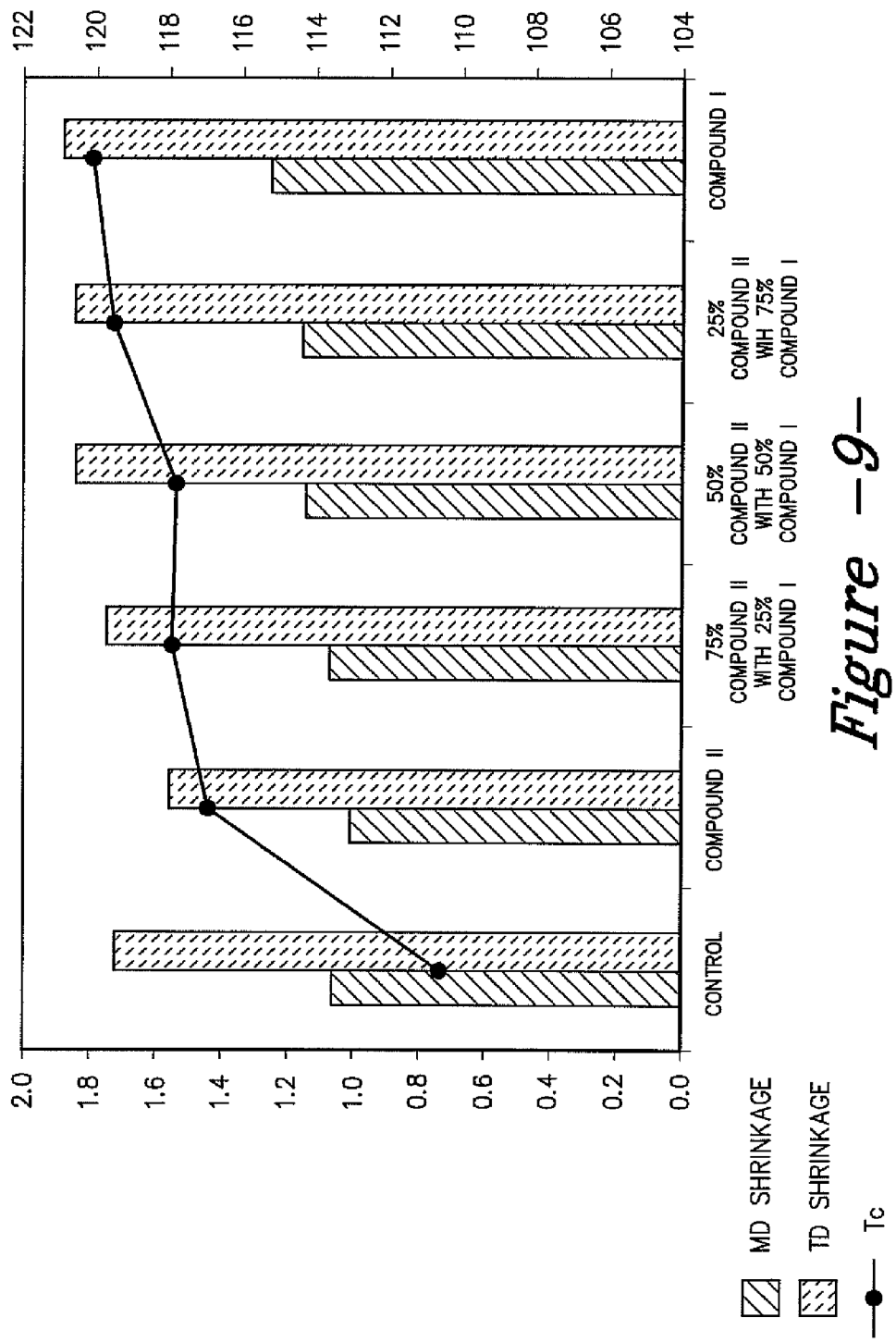
Figure -9-

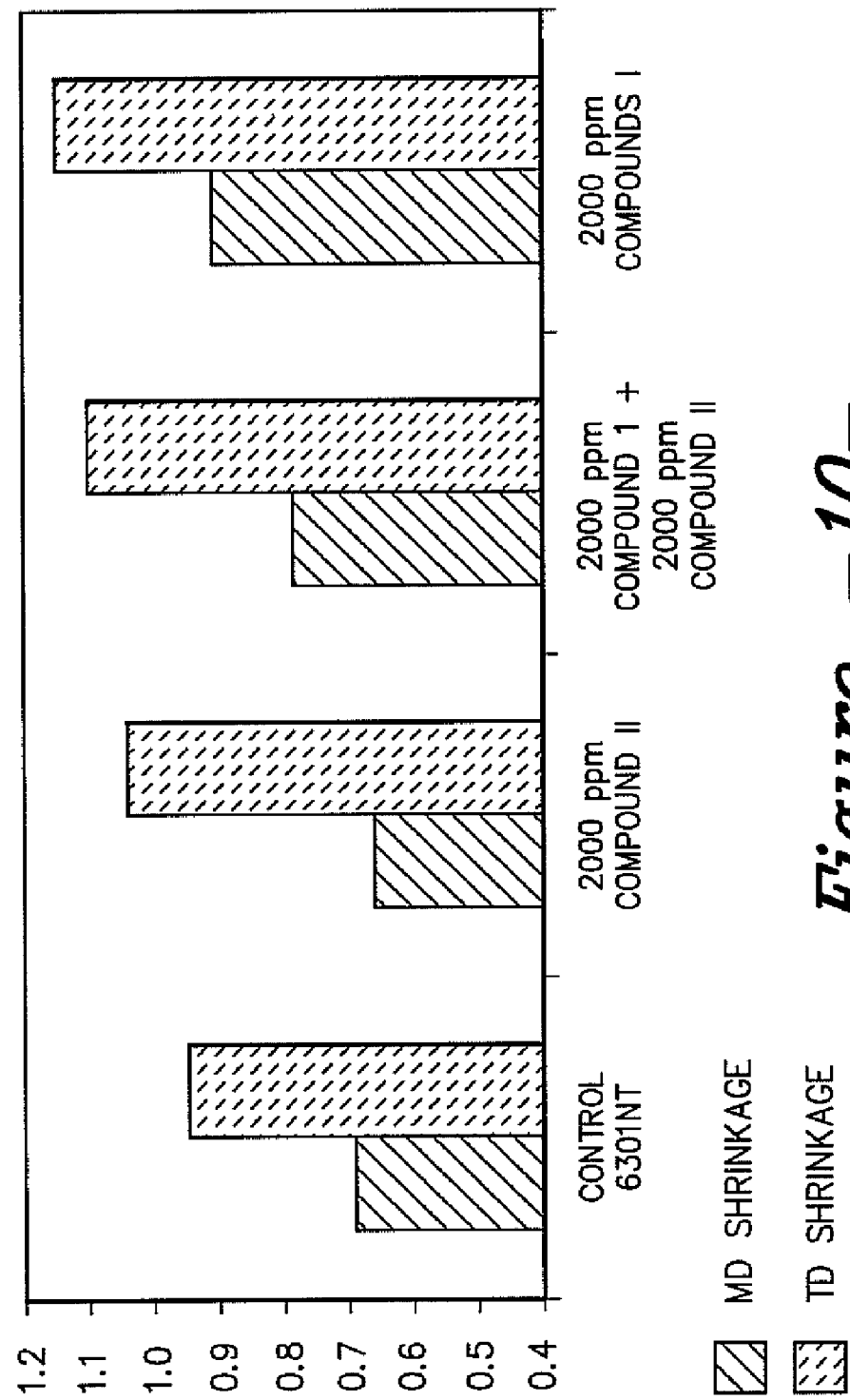
Figure -10-

NUCLEATING AGENT ADDITIVE COMPOSITIONS AND METHODS

CROSS REFERENCE TO RELATED APPLICATIONS

This application claims priority to a U.S. provisional application Ser. No. 60/780,296 filed on Mar. 8, 2006.

BACKGROUND OF THE INVENTION

Nucleating agents are employed as additives in polymer resin in the manufacture of plastic articles. Such manufacture may be by various methods, including by injection or extrusion molding.

Solid bicyclo[2.2.1]heptane dicarboxylate salt-containing thermoplastic nucleating additives are known. One commercially useful nucleating agent sold by Milliken & Company of Spartanburg, S.C. is Hyperform® HPN-68L. This nucleating agent is of the chemical structure below:

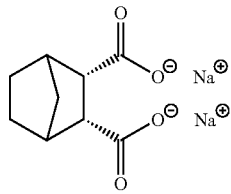

Hyperform® is useful in manufacturing plastic articles. It enables the polymer to achieve a significant cycle time reduction in the molding process compared to using non-nucleated polypropylene ("PP"). Cycle time reduction can be achieved in part by inducing in the resin a higher $T_c$ (crystallization temperature), which enables the molten resin to harden at higher temperature. This decreases the necessary cooling time and facilitates ejection of the articles from the mold at a faster rate than would be possible without the use of a nucleating agent. A common defect in a process as injection molding is deformation of the molded part as a result of different stresses caused by polymer orientation. Longer mold residence time is needed to stiffen the material to such an extent that it can withstand these stresses and inhibit the deformation. Cycle time can thus also be reduced by optimizing the shrinkage properties of polypropylene by adjusting the orientation of the polymer crystals by a nucleating agent. Nucleating agents that adjust the shrinkage to be more isotropic, i.e. shrinkage in the machine direction becoming equal to shrinkage in the transverse direction are favorable for reducing cycle time where deformation is the limiting factor in the molding process. Cycle time is very important in the economic viability and profitability of molded part manufacture.

U.S. Pat. Nos. 6,465,551; 6,562,890; and 6,995,202 disclose dicarboxylate metal salt compositions.

The use of clarifying agents to reduce haze in articles manufactured from crystalline polyolefin resins is known. Some compounds may serve as both nucleating agents and clarifying agents. Representative acetals of sorbitol and xylitol, which have been employed as clarifying agents, are disclosed generally in the Rekers, U.S. Pat. No. 5,049,605, bis (3,4-dialkylbenzylidene). Among clarifiers based on diacetals of sorbitol and xylitol, Millad 3988® is a commercially successful clarifier for polypropylene. It is a dimethyl substituted dibenzylidene sorbitol ("DMDBS"), 1,3:2,4-bis (3,4 dimethyl benzylidene sorbitol). Millad 3988® is manufactured and distributed by Milliken & Company of Spartanburg, S.C.

Milliken & Company commercially sells a nucleating agent product known as Hyperform® HPN-20E which employs a calcium metal ion, this compound having the chemical structure:

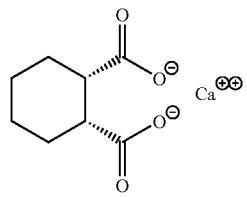

Other known compounds useful for nucleation include sodium 2,2'-methylene-bis-(4,6-di-tert-butylphenyl) phosphate (from Asahi Denka Kogyo K.K., known commercially as NA-11®), as shown below:

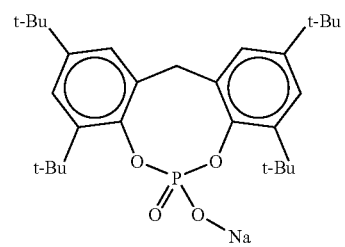

Such compounds all impart high polyolefin crystallization temperatures; however, each also exhibits its own drawback for large-scale industrial applications. U.S. Pat. Nos. 4,463,113 and 5,342,868 disclose crystalline synthetic resin compositions of cyclic organophosphoric esters.

When a polymer is melted into a thermoplastic article, the force applied in shaping the article creates stress in the article. Polymers typically have long chains and long relaxation times, therefore residual stress exists in such plastic articles. The residual stress will release after the article is shaped which manifests as shrinkage of the article. Generally when a nucleating agent is added, because of short cooling time, the orientation and residual stress from molding process are maintained. Plastic articles with nucleating agents typically have higher shrinkage than articles without nucleating agent. Sometimes there is too much shrinkage and the plastic articles are out of dimensional specifications. To manufacture parts that meet the dimensional specifications, some companies have tried to decrease shrinkage by adding impact modifying compositions or talcum.

A nucleating agent for polypropylene with a combination of positive material properties, like high Tc, low crystallization half time ($t_{1/2}$), isotropic shrinkage, and high stiffness would be highly desirable. Phosphate ester salts, like NA-11® and NA-21® (manufactured by Asahi Denka Kogyo Kabushiki Kaisha of Japan) are known to incur relatively high stiffness in injection molded articles. However, warpage caused by anisotropic shrinkage is often an undesired side effect of such materials. Such warpage is a disadvantage of using phosphate esters.

Each nucleating composition has its advantages and disadvantages. This has created a long-felt need in the polyolefin nucleator compound industry to provide compositions that minimize such problems and provide excellent peak crystallization temperatures for the target polyolefin. Unfortunately, it is a significant challenge to find nucleators exhibiting exceptionally high peak crystallization temperatures, low hygroscopicity, excellent thermal stability, high stiffness, and relatively low amounts of shrinkage or warpage in finished articles.

Blends of more than one nucleator used together have been tried, but are not always successful. Furthermore, this is a highly unpredictable area of the chemical arts, and there is usually no any way of knowing what will be effective until it is tried, and tested, and a relatively substantial amount of work is done.

U.S. Pat. No. 6,586,007 is directed to a combination of 3,4-dimethylbenzylidene sorbitol (DBS) and p-methylbenzylidene sorbitol (mDBS). U.S. Pat. Nos. 6,521,685 and 6,585,819 are directed to additives that comprise a blend of (a) bicyclic salts, and (b) benzylidene sorbitol acetals.

A commonly owned application assigned to Milliken and Company is U.S. Ser. No. 11/078,003 to Hanssen. This application is directed to a blended nucleating or clarifying composition for thermoplastics comprising a blend of more than one species of nucleating agent, the blend comprising: (a) a first nucleating agent of a carboxylic acid salt compound; and (b) a second nucleating agent of a phosphate-containing salt compound.

A nucleating agent additive composition that could achieve the remarkable advantage of cycle time reduction for molding processes and also exhibit little shrinkage as compared to current commercial systems would be very desirable, so that the nucleating agent could be easily used by thermoplastic manufacturers. This invention is directed to such a composition and methods for its use in the manufacture of polymeric articles. A nucleating agent composition that afford these advantages is desirable.

BRIEF DESCRIPTION OF THE DRAWINGS

The following drawings are provided.

FIG. 1 shows behavior of Compound I (commercial compound HYPERFORM® HPN-68L) when combined with another nucleating agent sodium benzoate;

FIG. 2 illustrates plaque shrinkage behavior using blends of the invention;

FIG. 3 reveals shrinkage data for blends of Compound I and Compound II at 500 ppm in homopolymer;

FIG. 4 shows shrinkage data for blends of Compound I and Compound II at 1000 ppm in homopolymer;

FIG. 5 shows half time data for such blends;

FIG. 6 shows additional shrinkage data;

FIG. 7 illustrates Tc data for various blends at different concentration levels;

FIG. 8 illustrates flexural modulus data;

FIG. 9 indicates shrinkage data for such blends; and

FIG. 10 provides further shrinkage data at different loading levels.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

In one aspect of the invention, it has been found that a blend of two different compounds may be applied together to form a nucleating agent additive composition. This additive composition is useful as an additive in thermoplastics, polyolefins and/or polymer resins.

That is, in one embodiment the invention is a blend of bicyclo[2.2.1]heptane dicarboxylate salt (Hyperform® HPN-68L), i.e. "Compound I":

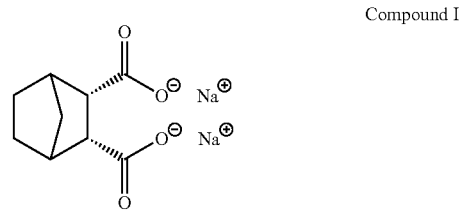

Compound I with the calcium metal salt (Hyperform® HPN-20E), i.e. "Compound II" as shown below:

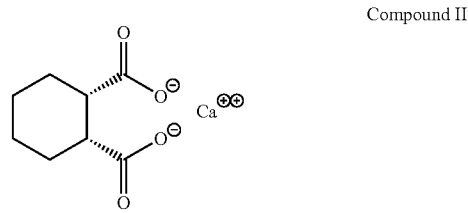

Compound II

This blend or mixture of these two compounds has been found to provide unexpected results in the nucleation of polymers. Unexpected results have been achieved by using them together to nucleate a polyolefin composition. Physical properties of the resulting molded articles are quite beneficial.

The composition formed by blending the Compound I with Compound II, and applying the resulting mixture into a polyolefin, addresses the problem of too much shrinkage in injection molded parts while keeping a high $T_c$ (potential for cycle time reduction). Further, the parts retain good mechanical properties.

When mixing Compounds I and II, the nucleated polyolefin article still maintains a relatively short crystallization half time and short cycle time, but the article has significantly less shrinkage than using Compound I alone. This finding is unexpected.

Compounds I is known as an excellent nucleator and even "overrides" other nucleators, such as sodium benzoate or other pigment nucleators. That is, it is commonly believed that Compound 1, when mixed with other nucleating agents, typically provides results in which the behavior of the mixture appears to be much more like Compound I, and very little like the other mixed in nucleating agent. Thus, it may be said that Compound I is believed to "override", or dominate, other nucleating agents when used with other nucleating agents. FIG. 1 shows that when Compound I is mixed with sodium benzoate (NaBz), for example, the injection-molded plaque shows the physical property of having Compound I alone, and the presence of NaBz has very little if any effect. This is known as Compound I "overriding" the sodium benzoate. FIG. 1 shows the machine direction and transverse direction shrinkage of NaBz and Compound I and blends of NaBz with Compound I in the ratios indicated in the FIG. 1. Compound I is known commercially as HYPERFORM® HPN-68L.

In the practice of the invention, however, when mixing Compound II with Compound I, physical properties such as shrinkage or Tc of the injection-molded plaque unexpectedly show both the effect of both Compound I and Compound II. Compound I unexpectedly does not override Compound II, which is unexpected given the common understanding of the behavior of Compound I when mixed with other nucleating agents. One possible reason or theory for this effect is that Compound I orients the b-axis of polypropylene in a different direction than Compound II. However, it is not known if that is in fact the technical cause of the effect, and the invention is not limited to any particular mechanism or action. Because of their unique nucleation and orientation feature, Compound I and Compound II, when combined, do not interfere each other therefore Compound I does not override Compound II, when provides very beneficial results in the practice of the invention.

The invention is made, in one embodiment, by adding Compounds I and II to polypropylene via one of several possible techniques:

1) Addition of nucleating agent powders in various ratios to PP reactor grade resins together with other additives (such as antioxidants and acid scavengers). This combination of materials is then melt-compounded, and subsequently used in a process such as injection molding, sheet extrusion, thermoforming, extrusion blow molding, injection stretch blow molding or film extrusion.
2) Addition of nucleating agent powders in various ratios to PP compounded material together with other additives (such as antioxidant and acid scavengers). This combination of materials is then melt-compounded, and subsequently used in a process such as injection molding, sheet extrusion, thermoforming, extrusion blow molding, injection stretch blow molding or film extrusion.
3) Addition of a combination of a concentrate (masterbatch) and nucleating agent powder in various ratios to either reactor material or compounded material together with other additives. This combination of materials is then melt-compounded, and subsequently used in a process such as injection molding, sheet extrusion, thermoforming, extrusion blow molding, injection stretch blow molding or film extrusion.
4) Addition of a two separate concentrates ("master batches") in various ratios to either reactor material or compounded material together with other additives. This combination of materials may be melt-compounded, and subsequently used in a process such as injection molding, sheet extrusion, thermoforming, extrusion blow molding, injection stretch blow molding or film extrusion.
5) Addition of a combined masterbatch of both nucleating agent Compounds I and II to a compounded resin. This material may be subsequently used in a process such as injection molding, sheet extrusion, thermoforming, extrusion blow molding, injection stretch blow molding or film extrusion. A melt-compounding step between addition of the combined master batch and injection molding is yet another option.

As used herein, the term "thermoplastic" refers generally to a polymeric or polymer material that will melt upon exposure to sufficient heat but will retain its solidified state upon cooling. "Thermoplastic" is used interchangeably herein with "polymer", or "polymeric". Thermoplastic refers to plastics having crystalline or semi-crystalline morphology upon cooling after melt-formation, usually by the use of a mold or like article. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such compounds and compositions that provide faster and or higher polymer crystallization temperatures are popularly known as nucleators. Such compounds provide nucleation sites for crystal growth during cooling of a thermoplastic molten formulation.

EXAMPLE 1

Mixing Compounds I and II for reduced shrinkage. When mixing Compounds I and II, the machine direction ("MD") and transverse direction ("TD") shrinkage decreases. The shrinkage isotropy improves. The effect is dependent on the types of acid scavengers that are employed. This may be seen in FIG. 2.

EXAMPLE 2

Lower loadings of Compound I and Compound II mixture. This example shows that when mixing Compounds I and II, the MD and TD shrinkage decreases, while the shrinkage isotropy improves. Shrinkage may be seen in FIGS. 3 and 4. Further, the crystallization half time decreases, as seen in FIG. 5. The crystallization half time plot with different mixing ratio shows that when mixing a small amount of Compound II with Compound I, the half time does not increase appreciably—but the shrinkage decreases significantly. This is unexpected, and quite beneficial.

The results indicate that it is possible to add this nucleator blend of Compound I and Compound II to a mixture to polyolefins—and thereby improve the article manufacturing cycle time, improve (decrease) warpage—and yet still keep the article dimension within specifications. This is unexpected, and very beneficial.

The addition of Compound II to a constant concentration of 500 ppm Compound I has a strong effect on decreasing shrinkage in both machine and transverse directions—while the crystallization temperature remains high. These results are shown in FIG. 6.

EXAMPLE 3

The results show that mixtures of Compound II and Compound I retain high Tc's with low relative content of Compound I. Lowering the relative content of Compound I may increase the flexural modulus of manufactured parts by almost 100 MPa. Reference is made to FIGS. 7 and 8.

EXAMPLE 4

Master batches (5%) of Compound II; 5% of Compound I; and combination of both nucleators (in ratios of 3:1, 1:1 and 1:3) were prepared on a Leistitz twin-screw extruder. These master batches were letdown (@ 1%) in an impact-copolymer polypropylene (Sabic 56M10 with a Melt Flow Rate (MFR) of about 6. Shrinkage, flexural modulus and peak crystallization temperature were measured and recorded in FIG. 9. Also, reference is made to Table 1.

TABLE 1

Physical Properties of Resin Compositions with Nucleating Agents Versus Control Compositions

| Compound | MD shrinkage (%) | stdev | TD shrinkage (%) | stdev | Isotropy (—) | stdev | Tc (°C.) | t½ minutes | Flexmod (MPa) |
|---|---|---|---|---|---|---|---|---|---|
| Control | 1.060 | 0.010 | 1.720 | 0.024 | 0.610 | 0.012 | 110.6 | 13.22 | 1191 |
| Cmpd II only | 1.000 | 0.020 | 1.550 | 0.037 | 0.640 | 0.020 | 116.9 | 2.82 | 1285 |
| 75/25 of Cmpd II/I | 1.070 | 0.010 | 1.750 | 0.028 | 0.610 | 0.012 | 117.9 | 2.40 | 1290 |
| 50/50 Cmpd II/I | 1.140 | 0.020 | 1.840 | 0.026 | 0.620 | 0.014 | 117.8 | 2.23 | 1279 |
| 25/75 Cmpd II/I | 1.150 | 0.010 | 1.840 | 0.020 | 0.620 | 0.010 | 119.5 | 1.53 | 1261 |
| Cmpd I only | 1.250 | 0.010 | 1.880 | 0.018 | 0.670 | 0.010 | 120.1 | 1.32 | 1250 |

In this system, the difference in Tc between the 3:1 mixture of Compound II to Compound I (i.e. "Cmpd II/I" above) and 100% Compound I is about 2 degrees C. Further, the shrinkage of the 3:1 mixture of Compound II/Compound I is almost the same as unnucleated ICP PP. The Tc of the 3:1 mixture is still almost 7.5° C. higher than unnucleated ICP PP, offering significant potential for cycle time reduction. This shows the unexpected and useful results of the blends of the invention. The mechanical properties of the material are slightly improved when higher relative amounts of Compound II are used.

EXAMPLE 5

The shrinkage reduction effect also works at very high concentrations, as further shown in FIG. 10. The addition of 2000 ppm of Compound II to PP nucleated with 2000 ppm Compound I causes a shrinkage reduction of 0.1% in the machine direction and 0.2% in the transverse direction.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

The invention claimed is:

1. A thermoplastic resin composition comprising
   (a) a thermoplastic polyproylene resin,
   (b) a first nucleating agent conforming to the formula:

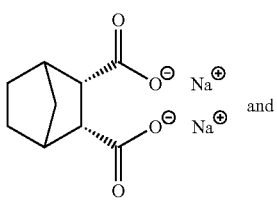

and (c) a second nucleating agent conforming to the formula:

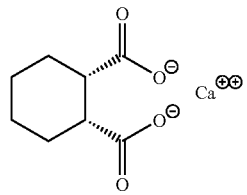

wherein the ratio of the amount of said first nucleating agent present in said composition to the amount of said second nucleating agent present in said composition is about 3:1 to about 1:3.

2. A thermoplastic article comprising the resin composition of claim 1.

3. The composition of claim 1, wherein the ratio of the amount of said first nucleating agent present in said composition to the amount of said second nucleating agent present in said composition is about 2:1 to about 1:1.

4. The composition of claim 1, wherein the ratio of the amount of said first nucleating agent present in said composition to the amount of said second nucleating agent present in said composition is about 3:1.

5. The composition of claim 1, wherein said composition further comprises an acid scavenger.

6. The composition of claim 5, wherein said acid scavenger is selected from the group consisting of calcium stearate and zinc stearate.

7. A method of making a molded polymeric article, said method comprising the steps of:
   (a) providing a polyolefin composition comprising a thermoplastic polypropylene resin, a first nucleating agent, and a second nucleating agent, wherein said first nucleating agent is comprised of:

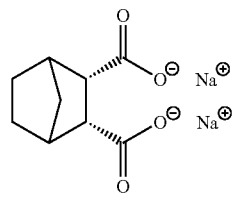

and said second nucleating agent is comprised of:

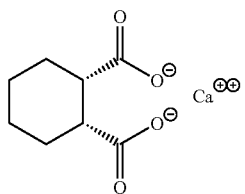

wherein the ratio of the amount of said first nucleating agent present in said polyolefin composition to the amount of said second nucleating agent present in said polyolefin composition is about 3:1 to about 1:3; and (b) molding said polyolefin composition to form an article.

8. The method of claim 7, wherein the ratio of the amount of said first nucleating agent present in said polyolefin composition to the amount of said second nucleating agent present in said polyolefin composition is about 2:1 to about 1:1.

9. The method of claim 7, wherein the ratio of the amount of said first nucleating agent present in said polyolefin composition to the amount of said second nucleating agent present in said polyolefin composition is about 3:1.

10. The method of claim 7, wherein said polyolefin composition further comprises an acid scavenger.

11. The method of claim 10, wherein said acid scavenger is selected from the group consisting of calcium stearate and zinc stearate.

* * * * *